United States Patent
Chang et al.

(10) Patent No.: US 6,737,196 B2
(45) Date of Patent: May 18, 2004

(54) METHOD OF MAKING A LITHIUM POLYMER BATTERY AND BATTERY MADE BY THE METHOD

(75) Inventors: Youn-han Chang, Suwon (KR); Jung-ho Kim, Suwon (KR)

(73) Assignee: Samsung Display Devices Co., Ltd., Suwon (KR)

(*) Notice: Subject to any disclaimer, the term of this patent is extended or adjusted under 35 U.S.C. 154(b) by 0 days.

(21) Appl. No.: 09/416,270

(22) Filed: Oct. 12, 1999

(65) Prior Publication Data

US 2003/0134202 A1 Jul. 17, 2003

(30) Foreign Application Priority Data

Oct. 13, 1998 (KR) .............................. 98-42711

(51) Int. Cl.⁷ .......................... H01M 4/64; H01M 4/70; H01M 4/74
(52) U.S. Cl. ......................... 429/241; 429/233; 429/242
(58) Field of Search ................... 429/233, 241, 429/242

(56) References Cited

U.S. PATENT DOCUMENTS

| | | | |
|---|---|---|---|
| 4,925,752 A | * | 5/1990 | Fauteux et al. |
| 5,543,250 A | * | 8/1996 | Yanagihara et al. ........ 429/241 |
| 5,552,239 A | | 9/1996 | Gozdz et al. |
| 5,554,459 A | * | 9/1996 | Gozdz et al. |
| 5,578,398 A | * | 11/1996 | Jenkins et al. .............. 429/233 |
| 5,750,289 A | * | 5/1998 | Kejha ......................... 429/233 |
| 5,902,697 A | * | 5/1999 | Guindy et al. .............. 429/153 |
| 6,007,588 A | * | 12/1999 | Mitchell ..................... 29/623.4 |
| 6,096,455 A | * | 8/2000 | Satake et al. ............... 429/241 |
| 6,168,885 B1 | * | 1/2001 | Narang et al. .............. 429/214 |

FOREIGN PATENT DOCUMENTS

| | | |
|---|---|---|
| EP | 647974 A1 | 4/1995 |
| EP | 762521 A2 | 3/1997 |
| EP | 777287 A2 | 6/1997 |
| EP | 849819 A2 | 6/1997 |
| JP | 10-106627 | 4/1998 |

OTHER PUBLICATIONS

Linden. Handbook of Batteries, 2nd ed., pp. 36.37–36.42, 1995 (no month).*
Linden. Handbook of Batteries, 2d, p. 15.26, 1995 (no month).*
Printout of Class 429 Definitions (p. 7). Nov. 13, 2001.*

* cited by examiner

Primary Examiner—Gabrielle Brouillette
Assistant Examiner—Tracy Dove
(74) Attorney, Agent, or Firm—Leydig, Voit & Mayer, Ltd.

(57) ABSTRACT

A lithium (Li) polymer battery is provided. The Li polymer battery includes: a positive plate including a positive collector having a plurality of openings and a positive active material layer on at least one surface of the positive collector; a negative plate including a negative collector in a foil form, and a negative active material layer on at least on surface of the negative collector; and a separator between the positive and negative plates, for insulating the positive and negative plates.

5 Claims, 3 Drawing Sheets

METHOD OF MAKING A LITHIUM POLYMER BATTERY AND BATTERY MADE BY THE METHOD

BACKGROUND OF THE INVENTION

1. Field of the Invention

The present invention relates to a lithium (Li) polymer battery, and more particularly, to a Li polymer battery having an improved negative plate structure.

2. Description of the Related Art

A rechargeable secondary battery is widely used in portable wireless electric apparatus such as camcorders, cellular phones and lap-top computers. There are various secondary batteries including a nickel-cadmium (Ni—Cd) battery, a lead acid battery, a nickel metal hydride (Ni—MH) battery, a lithium (Li) ion battery, a Li polymer battery, a metal Li secondary battery and the like.

In particular, the metal Li secondary battery has a driving voltage of 3.6 V, a life span longer than that of the Ni—Cd battery or the Ni—MH battery, and high energy density to weight ratio, so its use is gradually expanding.

The Li secondary battery is classified into a Li-ion battery using a liquid electrolyte and a Li polymer battery using a polymer solid electrolyte, according to the type of electrolyte. The Li polymer battery can be embodied into various shapes as opposed to the Li-ion battery, and has merits of high stability and light-weight.

FIGS. 1A and 1B shows the structure of a Bellcore Li polymer battery, a type of a Li polymer battery. Referring to FIGS. 1A and 1B a positive plate 11 and a negative plate 12 are stacked with a separator 13 interposed therebetween, each having a multilayered structure. The positive plate 11 consists of a positive collector 11a having a plurality of openings h1, and positive sheets 11b attached to both surfaces of the positive collector 11a. Also, the negative plate 12 consists of a negative collector 12a having a plurality of openings h2 and negative sheets 12b attached to both surfaces of the negative collector 12a. The positive and negative collectors 11a and 12a are formed of expanded metal.

A manufacturing process of the Bellcore Li polymer battery having the above structure will be described.

First, acetone as a solvent, a positive or negative active material, a binder, a conductive material and a plasticizer are mixed to prepare a slurry. Then the slurry is deposited on a polyethylene (PET) base film with a doctor blade to form a thin sheet, the PET base film is removed to produce an electrode sheet of the corresponding active material. Then, the electrode sheets are laminated to both surfaces of each collector at a high temperature by applying pressure, and then cut to a predetermined size.

The resulting positive and negative plates 11 and 12 are combined with the separator 13 interposed therebetween, and the stacked structure is further laminated at a high temperature by applying pressure, thereby resulting in a bi-cell structure. Then, the bi-cell structure is soaked in ether to extract the plasticizer. Then, an electrode assembly is formed by stacking 9 of the bi-cells. Then, positive and negative terminals are welded onto the assembly, and electrolyte is infiltrated into the empty space from which the plasticizer has been extracted. Finally, a case is formed around the resulting product.

In the conventional Li polymer battery completed by the above method, the positive and negative collectors 11a and 12a require the openings h1 and h2 through which the plasticizer is extracted, so manufacturing the positive and negative collectors 11a and 12a is complicated. Also, adhesive forces between the positive collector 11a and the positive sheets 11b and between the negative collector 12a and the negative sheets 12b become weak due to burr generated during the formation of the openings h1 and h2. In addition, the thicknesses of the positive and negative plates 11 and 12 are nonuniform.

Also, when attaching the electrode sheets 11b and 12b to the positive and negative collectors 11a and 12a, respectively, bubbles may form in the spaces between the sheet and collector due to the openings h1 and h2, thereby lowering conductivity of the positive and negative collectors 11a and 12a.

Also, the expanded metal forming the positive and negative collectors 11a and 12a is supplied in a roll having a width of less than 300 mm. The expanded metal has the property of being extendible in a longitudinal direction by force. Thus, it is difficult to manufacture the positive and negative collectors 11a and 12a through a continuous process by applying tensile strength.

In general, the material of the collectors determine the cost of the battery. Thus, using the expanded metal as a material for the collectors increases the cost of the battery, compared to using punched metal.

Also, as the expanded metal is mechanically processed, the metal itself is subject to stress. That is, when the expanded metal is cut in a predetermined size, fine powder of arsenic acid is separated from the collector made of the expanded metal. Also, because the collector made of the expanded metal is in the form of a mesh, a burr is generated due to expansion of strands in the mesh, thereby causing an electrical short circuit.

SUMMARY OF THE INVENTION

To solve the above problems, it is an object of the present invention to provide a lithium (Li) polymer battery in which a negative collector is a foil without openings, thereby improving the performance of plates and the productivity of the battery.

Accordingly, to achieve the above object, there is provided a lithium (Li) polymer battery comprising: a positive plate including a positive collector having a plurality of openings and a positive active material layer on at least one surface of the positive collector; a negative plate including a negative collector in a foil form, and a negative active material layer on at least on surface of the negative collector; and a separator between the positive and negative plates, for insulating the positive and negative plates.

Preferably, the negative collector is a copper (Cu) foil.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1A:
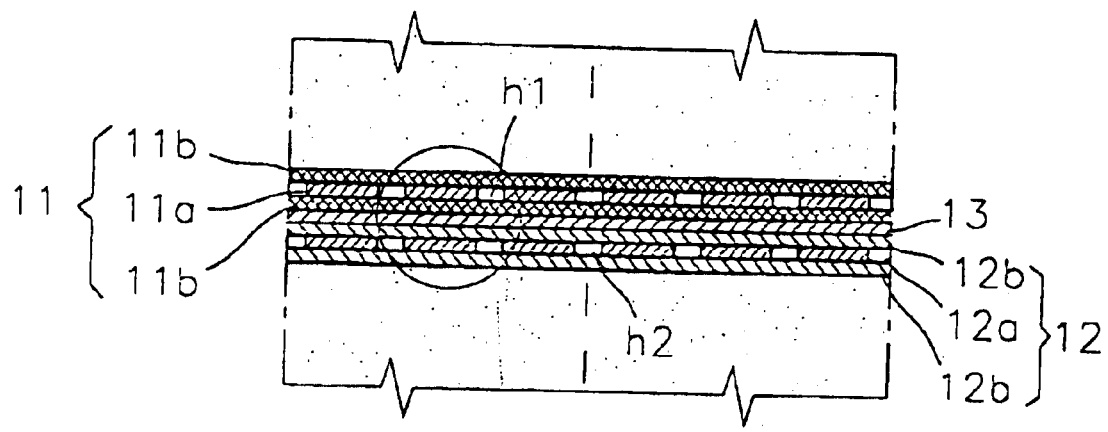
FIGS. 1A and 1B are partial sectional views of an electrode assembly of a conventional lithium (Li) polymer battery.
Figure 1B:
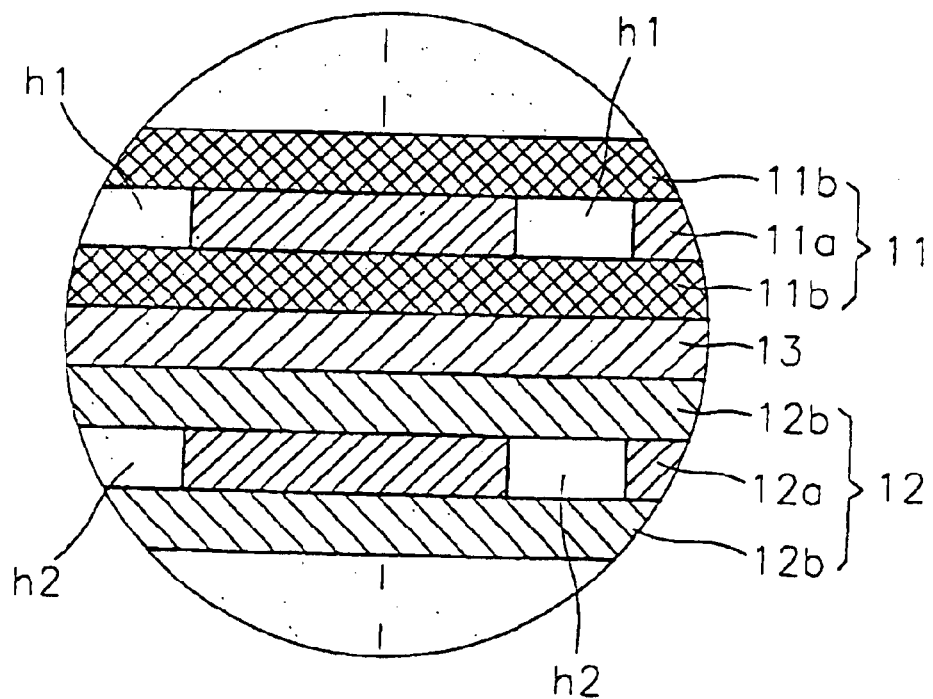
Figure 2:
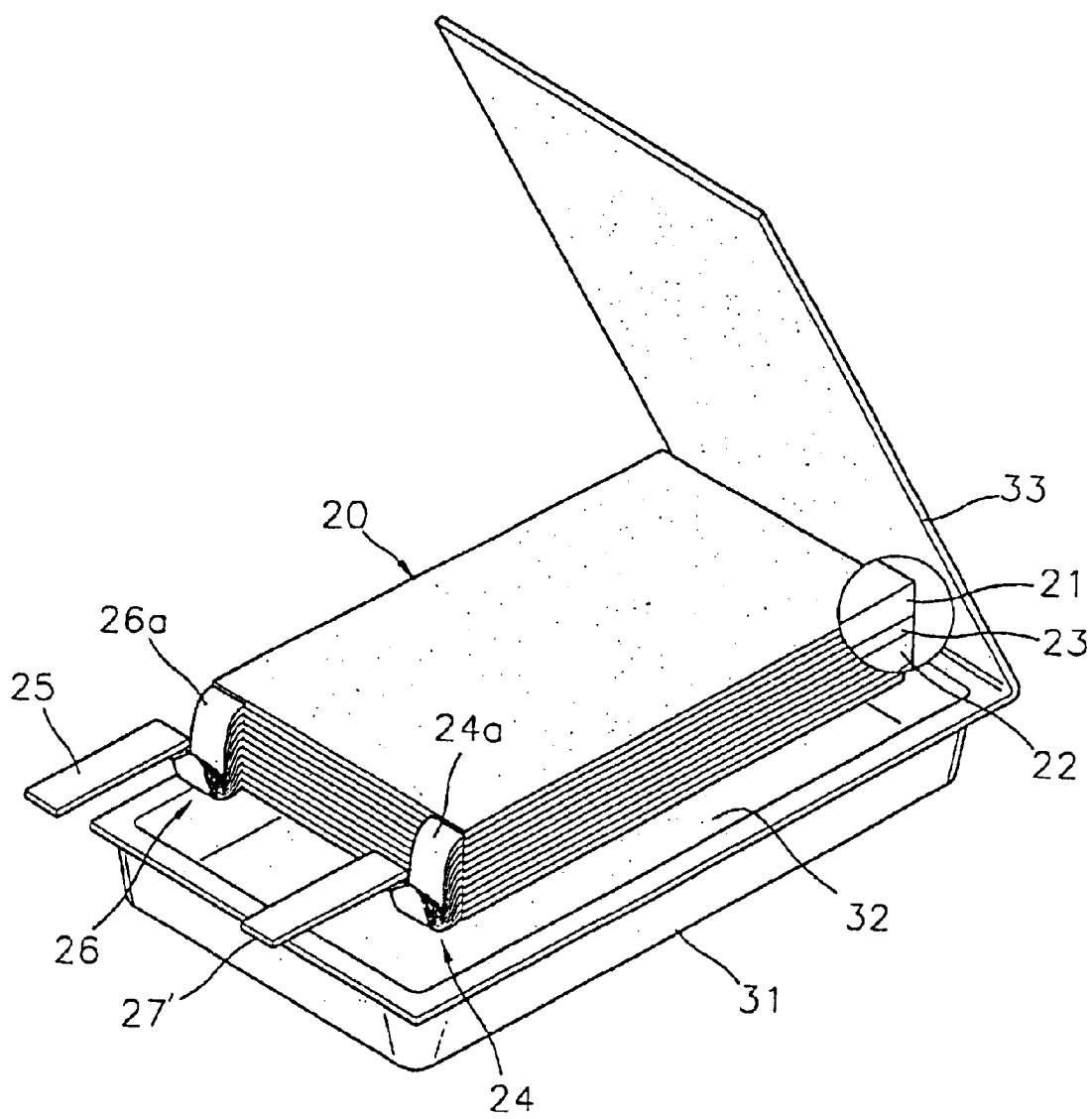
FIG. 2 is an exploded perspective view of a Li polymer battery according to the present invention.

Referring to FIG. 2, a lithium (Li) polymer battery according to the present invention comprises an electrode assembly 20, a lower case 31 having a receiving portion 32 for holding the electrode assembly 20, and an upper case 33 which covers the receiving portion 32 to seal the electrode assembly 20.

The electrode assembly 20 is formed by repeatedly stacking a positive plate 21 and a negative plate 22 with a separator 23 interposed therebetween, and positive taps 26a and negative taps 24a extend from the positive plates 21 and the negative plates 22, respectively.

The positive taps 26a and the negative taps 24a form a positive tap bundle 26 and a negative tap bundle 24 respectively, which are connected to a positive terminal 25 and a negative terminal 27 respectively. The positive terminal 25 and the negative terminal 27 are drawn out of the case when the electrode assembly 20 is put in the receiving portion 32 of the lower case 31 and the receiving portion 32 is then covered by the upper case 33.

Figure 3A:
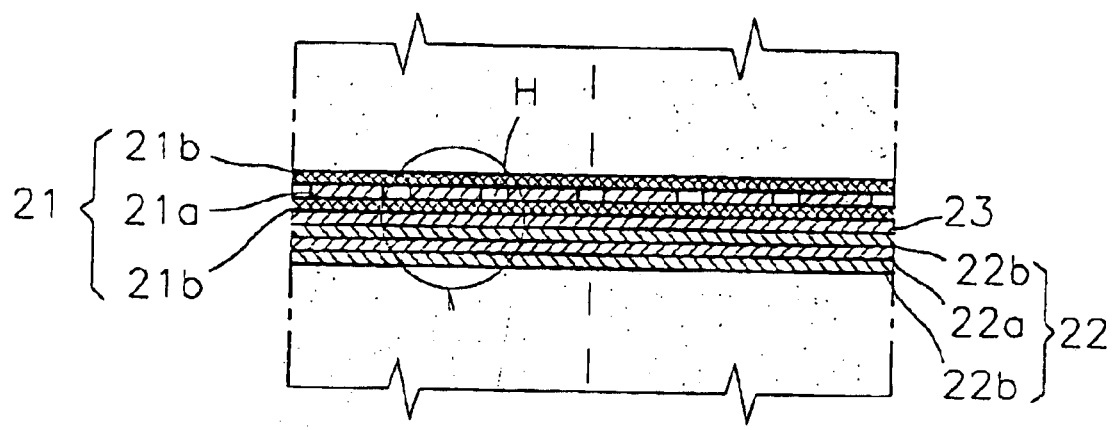
FIGS. 3A and 3B are partial sectional views of an electrode assembly shown in FIG. 2.
Figure 3B:
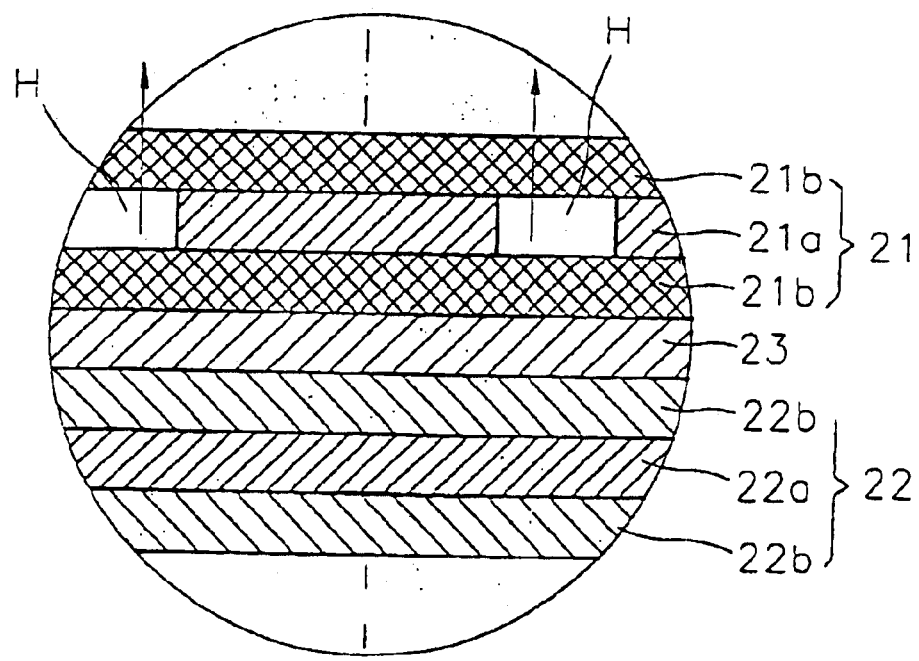

Referring to FIGS. 3A and 3B the positive plate 21 consists of a positive collector 21a having a plurality of openings H and a positive active material layer 21b on at least one surface of the positive collector 21a. Also, the negative plate 22 consists of a negative collector 22a in a foil form and a negative active material layer 22b on at least one surface of the negative collector 22a. The positive plate 21 is combined with the negative plate 22 with the separator 23 interposed therebetween in order to insulate the plates 21 and 22, forming a cell. Then, such a cell is repeatedly stacked to form the electrode assembly 20.

According to the present invention, preferably, the negative collector 22a is a copper (Cu) foil without openings, and the positive collector 21a is expanded metal or punched metal containing aluminum (Al), and has a plurality of openings H.

The positive plate 21 and the negative plate 22 are obtained by depositing a positive active material slurry and a negative active material slurry on both surfaces of positive collector 21a and negative collector 22a, respectively. The negative active material slurry is prepared by dissolving (10% total volume) polyvinylidene fluoride (PVDF) as a binder in N-methyl-2-pyrrolidone (NMP) and adding (18% total volume) plasticizer, (2% total volume) carbon black as a conductive material and (70% total volume) carbon as a negative active material to the solution, and then stirring the mixture until it reaches a viscosity of 20,000–30,000 centipoise (cps).

Also, the positive active material slurry is prepared by dissolving (10% total volume) PVDF as a binder in acetone, adding (15–18% total volume) plasticizer, (2–5% total volume) carbon black as a conductive material and (70% total volume) $LiCoO_2$ as a positive active material to the solution, and then stirring the mixture until it reaches a viscosity of 20,000 cps.

Preferably, the prepared negative and positive active material slurries are directly applied to both surfaces of the respective negative and positive collectors 22a and 21a using a doctor blade to form coatings.

According to another preferred embodiment, a positive active material slurry is prepared by dissolving (10% total volume) PVDF as a binder in acetone, adding (15–18% total volume) plasticizer, (2–5% total volume) carbon black as a conductive material and (70% total volume) $LiCoO_2$ as a positive active material to the solution, and then stirring the mixture until it reaches a viscosity of 20,000 cps.

Also, a negative active material slurry is prepared by dissolving (10% total volume) PVDF as a binder in acetone, adding (15–18% total volume) plasticizer, (2–5% total volume) carbon black as a conductive material and (70% total volume) carbon as a negative active material to the solution, and then stirring the mixture until it reaches a viscosity of 20,000 cps.

Then, the prepared positive and negative active material slurries are made into thin sheets, e.g., using a doctor blade and then the resulting sheets are attached to both surfaces of the respective positive and negative collectors 21a and 22a.

The amount of the materials contained in the positive and negative active material slurries can be varied without limitation to the described embodiments.

According to the present invention, the Cu foil without openings is adopted as the negative collector 22a, so that electrical conductivity is improved, adhesive force during the laminating on the negative collector 22a with the active material layer 22b is strong, and the thickness of the negative plate is uniform. Also, generation of a burr or bubbles between the conventional negative collector and negative sheet, caused by the openings, can be prevented.

In addition, even though the negative collector 22a has no openings, the plasticizer contained in the negative plate 22 and the separator 23 can be extracted through the openings H of the positive collector 21a in the direction indicated by the arrows in FIG. 3B.

Such effect of the present invention can be understood more fully through the following experiments.

EXPERIMENTAL EXAMPLE 1

The amount of plasticizer extracted from the conventional battery adopting the negative collector 21a which is made of a expanded Cu and has openings was compared with that of the battery adopting Cu foil as the negative collector 22a a according to the present invention. Here, each electrode assembly had 9 bi-cells, and (15% total volume) the plasticizer was used for the preparation of the bi-cells.

As a result, the amount of plasticizer extracted from the conventional battery was approximately 3.4801 g, and that from the battery according to the present invention was approximately 3.4526 g, which were nearly the same. That is, it can be understood that the amount of plasticizer extracted from the battery is not decreased even though the Cu foil without openings is adopted as a negative collector.

EXPERIMENTAL EXAMPLE 2

A positive sheet having a thickness of approximately 80 $\mu$m and a negative sheet having a thickness of approximately 120 $\mu$m were respectively attached to the positive collector 21a of Al expanded metal, and the negative collector 22a formed of a Cu foil having a thickness of 20 $\mu$m, to obtain a battery according to the present invention. Then, the resistance of the battery was measured and compared with that of the conventional battery.

As a result, the resistance of the battery according to the present invention was 50–60 m$\Omega$ while that of the conventional battery was 80–100 m$\Omega$. That is, it can be understood that the electrical conductivity of the Li polymer battery according to the present invention increases as the contact area between the electrode negative sheet and the negative collector increases.

Also, the adhesive force of the negative plate was increased to 18 gf/mm$^2$ or more compared to 10 gf/mm$^2$ of the conventional negative plate. As a result, the life span of the battery was increased by approximately 7% or more with respect to the conventional battery, and the energy density of the battery increased by 5–10%.

In addition, because a foil having a comparatively large tensile strength is used as a negative collector, manufacturing through continuous processing is possible. Also, the negative active material slurry can be applied directly to the negative collector, so that manufacture of the plate is simplified.

What is claimed is:

1. A method of making a lithium polymer battery comprising:

preparing a positive active material by preparing a first solution by dissolving a binder in a solvent, adding a plasticizer, and adding LiCoO2 as a positive active material, and adding carbon black to the first solution to produce a first mixture;

stirring the first mixture to increase viscosity of the first mixture;

directly applying the first mixture to opposite sides of each of first and second aluminum foils, the first and second aluminum foils including a plurality of through holes extending through the first and second aluminum foils, as first and second positive collectors, to form first and second positive plates;

preparing a negative active material by preparing a second solution by dissolving a binder in a solvent and adding a plasticizer, and adding carbon black to the second solution to produce a second mixture;

stirring the second mixture to increase viscosity of the second mixture;

directly applying the second mixture to opposite sides of a copper foil, the copper foil being free of holes, as a negative collector, to form a negative plate;

laminating the first positive plate and the negative plate on opposite sides of a first separator and laminating the second positive plate and the negative plate on opposite sides of a second separator, the first and second positive plate sandwiching the negative plate and the first and second separators; and extracting the plasticizer from the first and second positive plates and the negative plate.

2. The method according to claim 1, wherein the binder is polyvinylidene fluoride.

3. The method of claim 1, wherein the first and second solvents are acetone and N-methyl-2-pyrrolidone, respectively.

4. A method of making a lithium polymer battery comprising:

preparing a positive active material slurry by preparing a first solution by dissolving a binder in a solvent, adding a plasticizer, adding LiCoO2 as a positive active material, and adding carbon black to the first solution to produce a first mixture, and stirring the first mixture to increase viscosity of the first mixture and to produce the positive active material slurry;

forming sheets of the positive active material slurry;

applying the sheets of the positive active material slurry to opposite sides of each of first and second aluminum foils, the first and second aluminum foils including a plurality of through holes extending through the first and second aluminum foils, as first and second positive collectors, to form first and second positive plates;

preparing a negative active material slurry by preparing a second solution by dissolving a binder in a solvent and adding a plasticizer, adding carbon black to the second solution to produce a second mixture, and stirring the second mixture to increase viscosity of the second mixture and to produce the negative active material slurry;

forming sheets of the negative active material slurry;

applying the sheets of the negative active material slurry to opposite sides of a copper foil, the copper foil being free of holes, as a negative collector, to form a negative plate;

laminating the first positive plate and the negative plate on opposite sides of a first separator and laminating the second positive plate and the negative plate on opposite sides of a second separator, the first and second positive plate sandwiching the negative plate and the first and second separators; and extracting the plasticizer from the first and second positive plates and the negative plate.

5. The method according to claim 4 wherein the binder is polyvinylidene fluoride.

* * * * *